(12) United States Patent
Hirota et al.

(10) Patent No.: US 7,300,692 B2
(45) Date of Patent: Nov. 27, 2007

(54) RUBBING CLOTH FOR USE IN MANUFACTURING LIQUID CRYSTAL DISPLAY PANELS

(75) Inventors: Yasuo Hirota, Aichi (JP); Kenji Nishiguchi, Aichi (JP); Kazuo Kani, Aichi (JP); Takashi Inoue, Tokyo (JP); Hayami Tabira, Tokyo (JP)

(73) Assignees: Hayashi Telempu Co., Ltd, Aichi (JP); Hitachi, Ltd., Tokyo (JP)

( * ) Notice: Subject to any disclaimer, the term of this patent is extended or adjusted under 35 U.S.C. 154(b) by 216 days.

(21) Appl. No.: 10/845,765

(22) Filed: May 14, 2004

(65) Prior Publication Data

US 2005/0067042 A1 Mar. 31, 2005

(30) Foreign Application Priority Data

May 15, 2003 (JP) .............................. 2003-137525

(51) Int. Cl.
*D03D 27/00* (2006.01)
*D03D 27/06* (2006.01)
*B32B 3/02* (2006.01)
*B32B 3/26* (2006.01)

(52) U.S. Cl. .......................... 428/88; 428/92; 428/93; 139/391

(58) Field of Classification Search ............... 428/88, 428/92, 93; 139/426 R, 391, 383 R
See application file for complete search history.

(56) References Cited

U.S. PATENT DOCUMENTS

| 2,060,103 | A | * | 11/1936 | Morgan ..................... 139/402 |
| 2,171,367 | A | * | 8/1939 | Kaufman ..................... 139/21 |
| 2,714,399 | A | * | 8/1955 | Hoeselbarth ................. 139/39 |
| 3,341,386 | A | * | 9/1967 | White et al. .................. 156/72 |
| 3,550,226 | A | * | 12/1970 | Pachmann ..................... 28/159 |
| 4,702,949 | A | * | 10/1987 | Rohleder et al. ............. 428/92 |
| 5,879,497 | A | * | 3/1999 | Nakahara et al. ............. 156/99 |
| 6,219,123 | B1 | * | 4/2001 | Naito et al. ................. 349/126 |
| 2002/0189702 | A1 | * | 12/2002 | Smissaert et al. ........... 139/418 |
| 2003/0108685 | A1 | * | 6/2003 | Tabira et al. ................ 428/1.2 |
| 2003/0108712 | A1 | * | 6/2003 | Tabira et al. ................ 428/96 |
| 2004/0189912 | A1 | * | 9/2004 | Lee et al. .................... 349/125 |

FOREIGN PATENT DOCUMENTS

| JP | 09031799 A | * | 2/1997 |
| JP | 11237636 A | * | 8/1999 |
| WO | WO 03012536 A1 | * | 2/2003 |

* cited by examiner

*Primary Examiner*—Cheryl A. Juska
(74) *Attorney, Agent, or Firm*—Knobbe Martens Olson & Bear, LLO

(57) ABSTRACT

The present invention provides a rubbing cloth for use in manufacturing liquid crystal display panels which consists of a velvet fabric having a ground sheet texture comprising warps and wefts, and pile yarns woven to the ground sheet texture in the warp direction, wherein synthetic fibers as the warps were woven with combination of different tensions of the synthetic fibers, or the ground sheet texture comprises warps with combination of different feed lengths, so that the pile yarns are stably inclined.

19 Claims, 9 Drawing Sheets

(a)

(b)

(a)

(b)

Ground Warp
(Cross Sectional View)

14b  14b'

(a)

(b)

(a)

(b)

RUBBING CLOTH FOR USE IN MANUFACTURING LIQUID CRYSTAL DISPLAY PANELS

BACKGROUND OF THE INVENTION

1. Field of the Invention

This invention relates to a rubbing cloth for use in manufacturing liquid crystal display panels. In the manufacturing process of liquid crystal display panels, an alignment treatment process is conducted by using a rubbing roller. The rubbing roller consists of a metal roller and a rubbing cloth fastened on peripheral surface of the meta roller with a double-sided adhesive tape The rubbing cloth has a pile of raised fibers. The alignment treatment process is a process for providing unidirectional molecular orientation on the surface of alignment layer by uniformly rubbing the surface of the alignment layer with the pile on the above rubbing roller rotating at a high speed wherein the alignment layer was formed on each of two substrates which is constituents of a liquid crystal display panel. This process is called alignment process or rubbing process. This invention relates to a rubbing cloth used in the rubbing process which is indispensable to manufacturing of liquid crystal display panels.

The rubbing process is explained with referring to FIG. 5 as follows. The rubbing process is an operation of rubbing the surface of an alignment layer formed on substrate 5, which is a constituent of a liquid crystal display panel, with a pile of cloth 2 on surface of metal roller 1 rotating at a high speed. The cloth 2 has been fastened on peripheral surface of metal roller 1 with a double-sided adhesive tape, and the cloth 2 has a pile of raised fibers. This rubbing process is conducted for providing unidirectional molecular orientation on the surface of alignment layer. The mark "d" in FIG. 5 denotes a pushing depth of cloth 2 onto surface of substrate 5, which is commonly called a depth of bite. The level of depth of bite d is most influential on alignment performance.

2. Description of the Prior Art

Transmission-type liquid crystal display panels are composed of a TFT substrate, CF substrate and liquid crystal which is encapsulated in the small gap between these two substrates. The TFT substrate has pixel driving devices made of thin-film transistor (TFT) array. The CF substrate has an area patterned color filter (CF) layer. On the TFT substrate, patterned ITO film is fabricated as pixel electrodes which are entirely covered with an alignment layer.

The TFT substrate and the CF substrate are assembled in face-to-face fashion where the two alignment layers directly sandwich the encapsulated liquid crystal. The alignment layers on surfaces of TFT substrate and CF substrate have been subjected to an aligning treatment process by using a rubbing cloth in order to bring liquid crystal molecules into alignment. Usually, the rubbing cloth is fastened on peripheral surface of aluminum or stainless-steel roller with a double-sided adhesive tape. The rubbing cloth on the peripheral surface of the roller, while the roller is rotated, is brought into contact with the alignment layer surface to rub the alignment layer surface with the rubbing cloth. By conducting such rubbing treatment for the alignment layers, ultrafine grooves are formed on the alignment layer surface, or unidirectional molecular orientation is appeared in polyimide molecules which are macromolecules for forming the alignment layer. When the liquid crystal is brought into contact with the rubbing-treated alignment layers, the liquid crystal molecules can be aligned in the direction in which the alignment layer has been rubbed with the rubbing cloth. Accordingly, uniform switching characteristics induced by electric field of the liquid crystal display panel has been achieved. The performance of liquid crystal alignment provided by the rubbing treatment is influential on uniformity of display characteristic which is the most important characteristic for liquid crystal display panels.

As the rubbing cloth, a velvet fabric is commonly used which comprises a ground sheet and a pile of raised fibers woven to the ground sheet. As materials of the pile, long fibers (filaments) such as rayon and nylon and short fibers such as cotton are known in the art. As texture of velvet used for the rubbing cloth, a velvet fabric comprising a fast pile shown in FIG. 7 is commonly used (refer to Japanese Patent No. 3209328). In the velvet fabric, cupra rayon is used as the warps and wefts of ground sheet texture, and viscose rayon is used as the pile. Furthermore, a velvet fabric comprising a V-shaped pile (cut pile) shown in FIG. 8 is also used (refer to Japanese Registered Utility Model No. 3045464). In the velvet fabric, cotton is used as the pile. However, the texture of velvet is not limited to these combinations. For example, it is possible to weave a fast pile texture even if cotton is used as the pile. In prior arts, cellulose fibers have been used as ground yarns of velvet fabric which is used as a rubbing cloth. There is no prior art in which hydrophobic synthetic fibers or thermoplastic or hot-melt synthetic fibers are used as ground yarns.

Regarding to rubbing cloths consisting of the above types of velvet fabric, an effective method is known for preventing unevenness in the alignment due to uneven rubbing, which is a method wherein the pile is inclined to such a direction that the tip of pile is inclined from the position of root of pile (refer to Japanese Registered Utility Model No. 3032820). However, in the above described velvet fabric, the pile cannot be inclined at a desired angle only by effect of the woven texture.

As a method for inclining a pile of rubbing cloth in prior arts, for example, Japanese Registered Utility Model No. 3032820 discloses such method in detail for a velvet rubbing cloth wherein rayon is used as the pile. Specifically, it discloses a method comprising steps of immersing a velvet fabric obtained by ordinary weaving process in a cellulose-reactive glyoxal resin, combing the velvet fabric with a brush in a curing machine, and then heating and curing the resin to fix the inclination of pile. This method is called resin impregnation. Furthermore, this method is also effective for applying to regenerated cellulose fibers and fibers consisting of cellulose derivatives (i.e., cellulose fibers) besides rayon, such as cotton, polynosic fibers and lyocell because the cellulose-reactive glyoxal resin is used in the method. However, there are some problems in the method for inclining a pile by resin treatment, and the problems have to be solved in view of high definition and high yield in manufacturing liquid crystal display panels.

Furthermore, regarding to rubbing cloths comprising a cotton pile, there is no effective method for uniformly inclining the pile, except the same method as the above resin impregnation to rubbing cloths comprising a rayon pile.

In the above described resin treatment of the prior art, there is a high possibility that the treated shape and characteristics of the cloth are different between lots. Thus, in the manufacturing process of liquid crystal display panels, a new arrival of velvet fabric is previously put in an experimental use for rubbing in order to check the alignment quality and confirm whether the velvet fabrics in the lot can be used or not. After the check, the velvet fabrics in the lot are used in the manufacturing process. However, even if such check was done, unexpected rubbing faults occurs because unevenness of quality in the cloths themselves are not improved.

Furthermore, in conventional velvet of rayon, there is another problem that is concerning the resin itself. Specifically, since rubbing cloths (velvet) are immersed in a cellulose reactive resin, the resin is adhered to the surface of each of the short fibers that constitute the pile of velvet. This resin tends to be relatively hard and brittle. Consequently, it tends to wear away and fall during the rubbing treatment and adhere on the alignment layer surface as a contaminant, and it results in the occurrence of defects such as faulty display (refer to H. Tabira and T. Inoue et al. "Precision Rubbing Supported by Fine Process Analysis" Journal of the SID Vol.10, No.4, 329-337(2002)). Furthermore, the contaminants caught in the pile sometimes cause scratch defects on the alignment layer surface.

Furthermore, since the cellulose reactive resin is an aqueous emulsion, the rubbing cloths using cupra as ground yarns are easy to deform when they are in the moist state. This may cause a bow-shaped deformation (commonly known as bowing) in the wefts of the rubbing cloths, which is in turn easy to cause what is call a texture curving where the wefts do not intersect the warps at right angles.

These are the reasons why there are strong demands for means that can provide a pile with a stable inclination at high accuracy while avoiding the use of the resin impregnation.

As a method of forcing the pile to incline while avoiding the resin impregnation treatment, a method is known, in which, after forming a pile of thermoplastic synthetic fibers, the pile is combed with a brush in the intended direction while the back side of the velvet fabric is heated by contacting a heating cylinder, and then cooled so that the pile is fixed. However, since this method is easily affected by the temperature and humidity of open air, it is difficult to mass produce rubbing cloths stably with the inclination angle of their pile kept constant. Furthermore, if this method is applied to velvet fabric with a pile of cellulose fibers such as cotton, it is difficult to provide the pile with a stable inclination angle because the cellulose fibers are not thermoplastic.

As described above, in conventional methods of providing a pile with an inclination, their application is limited to certain pile materials, or even if they are applicable, there still remain unsolved problems inherent in the methods themselves.

In a velvet with a fast pile as shown in FIG. 7, when it is tried to incline the pile in the direction parallel to the warps, the pile tends to be inclined in the direction which deviates a little from the direction parallel to the warps (not parallel to the warps). In this case, it is known that if the rubbing cloth is fastened on a rubbing roller without allowing for the above described deviation, in such a manner as to make the warps direction (weaving direction) correspond to the direction in which the rubbing roller is rotated, the pile contacts small irregularities on the object of rubbing treatment and vibrates to cause alignment specks in rows in the alignment layer.

Thus, in conventional methods, when cutting off rubbing cloths from raw woven fabric, it is necessary to cut them at a little angle from the warp direction (weaving direction) with allowing for the above described deviation. However, it causes a problem of increased loss of fabric.

The cause of the deviation of pile's inclination from the direction parallel to the warps, which occurs in velvet with a fast pile, is described in connection with FIG. 9. FIG. 9 is an enlarged view of the circled portion of the velvet of FIG. 7 and corresponds to the cross section seen from the side parallel to the wefts. With regard to the relation between one weft 30 and two adjacent warps 31 and 32, on the woven texture, one warp 32 of the two adjacent warps is positioned on the front side of the weft 30 while another warp 31 is positioned on the back side of the weft 30 as shown in FIG. 9. Thus, the weft 30 passing between the two warps is not kept level, but inclined a little (slants to the left in FIG. 9). As a result, the pile intended to be raised perpendicular to the wefts is inevitably inclined. This leads to the deviation of the direction in which the pile is inclined from the warp direction.

When a natural fiber such as cotton is used for one or both of the ground warps and ground wefts of a rubbing cloth, it cannot be usually done to completely remove cotton waste such as withered stalk, leaf and petal in the manufacturing process because the fiber used therein is a natural fiber. As the result, the natural fiber containing cotton waste is woven as it is. If a rubbing cloth wherein cotton waste remains in the ground sheet is used for rubbing treatment process, the surface of alignment layer is injured by the cotton waste which fell on the surface or by change of total thickness. As the result, the uniformity of display characteristic is decreased, which is the most important characteristic for liquid crystal display panels. When a short fiber such as cotton is used for ground yarns, the weaving processability is decreased because it is apt to appear nap compared with a long fiber. As the result, there is a limitation of diameter of fiber used for ground yarns, and it is difficult to increase the density of pile in a warp direction of the specified woven texture. Furthermore, the elongation by stress is large. Especially, in manufacturing process of liquid crystal display panels under moist state, the elongation is remarkably large.

There is also some problems regarding to dimensional instability when a natural fiber is used for a rubbing cloth. Concretely, the problems are concerning that the sheet elongates through rubbing treatment process and that the dimension of sheet is changed after cutting process.

In the liquid crystal display devices which were formed of substrates whose alignment layers were rubbing-treated with a rubbing cloth of velvet fabric, non-uniform brightness may sometimes occur in the direction parallel to the rotation axis of rubbing roller. It is reported that one of the causes of the occurrence of non-uniformity is the elongation of velvet and slackening of sheet (refer to Japanese Patent No. 3209328).

In the manufacturing process of liquid crystal display panels, there are many cases that the relative humidity in the atmosphere is set rather high (about 60% or more) to decrease the generation of static electricity in order to prevent static damage to the TFT elements. On the other hand, in rubbing cloth used at present, there are many cases that cupra rayon is used as the fibers of ground cloths. The cellulose fibers such as cupra rayon and viscose rayon are easy to elongate in a high humidity condition rather than hydrophobic synthetic fibers (refer to "Textile Basic Engineering [I]", p55, published by The Textile Machinery Society of Japan on Jul. 30, 1969). The elongation is a problem which is difficult to be solved.

In a cutting process of the rubbing cloth, it is very important to exactly cut it at a desired angle to the warps direction. In the prior arts, the cutting process is conducted on the assumption that the wefts intersect the warps at right angles. However, a texture curving frequently occurs in a finishing processes such as desizing and refining processes and resin-coating processes to the back side of the cloth. The texture curving particularly occurs near the both selvedges of cloth. This seems to be one of causes that the alignment properties of the rubbing treated liquid crystals are different between lots of the rubbing cloths.

Furthermore, after the rubbing cloth was cut, it is very important that the length of the rubbing cloth is not changed in its longitudinal direction because the rubbing cloth is fastened on peripheral surface of rubbing roller with a double-sided adhesive tape. Concretely, after the rubbing cloth was wound around the rubbing roller, the shrinkage of the rubbing cloth causes an opening on the joining part, or the elongation causes an overlap on the joining part or a slack of the cloth. These cause partial rubbing faults.

For manufacturing a rubbing roller, a raw woven fabric is made by using a weaving machine at a predetermined weaving width, and the raw woven fabric is cut into a desired size which fits with the size of a roller, and then it is fastened on surface of the roller with a double-sided adhesive tape. As a method of cutting the raw woven fabric in the above processes, a press cutting is conventionally done at ambient temperature. When the press cutting is done, there is a case that pile near the cutting portion comes off and falls on the cloth even if acrylic resin or polyvinyl acetate resin was coated on the back of the rubbing cloth wherein the back has no pile. Furthermore, even if the pile which came off and fell was removed, there is a case that the pile further comes off and falls during the rubbing process when the warps or wefts on the edge have frayed. These fibers which fell or frayed, contact to the alignment layer surface in the rubbing process. As the result, the alignment layer is injured, and the uniformity of display characteristic may be decreased, which is the most important characteristic for liquid crystal display panels.

Especially, the problems frequently occur when the rubbing cloth is cut in the direction not parallel to the textile direction (the warp direction). Such cutting in the direction not parallel may be necessary when the rubbing cloth is fasten on the rubbing roller with the best direction of inclination of the pile.

SUMMARY OF THE INVENTION

The present invention provides a rubbing cloth which is very useful for manufacturing liquid crystal display panels.

An object of the present invention is to provide a rubbing cloth which has no problem such as a fault due to resin impregnation and no limitation of the pile material and which comprises a pile with a stable inclination in a velvet texture.

Furthermore, an object of the present invention is to provide a rubbing cloth which can eliminate adverse influences due to cotton waste on alignment layer surface and necessity of long time for removing cotton waste, and wherein the elongation and dimensional change of cloth hardly occur in a high humidity condition.

Furthermore, an object of the present invention is to provide a rubbing cloth wherein falling of pile waste and fraying of the warps or wefts are few when the cloth is cut.

The present inventors directed their attention to a method of controlling the tension balance of the warps of velvet ground sheet to obtain a rubbing cloth whose pile is raised with its stable inclination. An ordinary ground sheet texture is a plane weave comprising warps and wefts wherein the tensions of the warps and the wefts are kept constant respectively. Furthermore, the tension of the warps is set almost the same as that of the wefts to make the cloth construction isotropic. However, for example, if the tensions of warps are alternated at optional predetermined intervals, the wefts interwound with the warps become to be in up and down bumpy form, and as the result, pile yarns which were woven to the ground sheet in such a manner as to wind itself around the wefts are inclined in the warp direction.

That is, one of the present invention is a rubbing cloth for use in manufacturing liquid crystal display panels which consists of a velvet fabric having a ground sheet texture comprising warps and wefts, and pile yarns woven to the ground sheet texture in the warp direction, wherein synthetic fibers as the warps were woven with combination of different tensions of the synthetic fibers.

Furthermore, the present inventors directed their attention to a method of alternating the feed amounts of warps of velvet ground sheet at optional predetermined intervals to obtain a rubbing cloth whose pile is raised with its stable inclination. Concretely, if the feed amounts of warps in weaving process are alternated to be lager/smaller, the wefts interwound with the warps become to be in up and down bumpy form, and as the result, pile yarns which were woven to the ground sheet in such a manner as to wind itself around the wefts are inclined in the warp direction.

That is, one of the present invention is a rubbing cloth for use in manufacturing liquid crystal display panels which consists of a velvet fabric having a ground sheet texture comprising warps and wefts, and pile yarns woven to the ground sheet texture in the warp direction, wherein the ground sheet texture comprises warps with combination of different feed lengths.

These inventions can provide a stable inclination of pile not by means of resin treatment and heat brushing, but by control of the cloth construction itself. Consequently, the rubbing cloth does not have limitation of the pile material nor problem such as fault due to conventional resin impregnation. In these inventions, the pile yarns are inclined in the warp direction relative to the normal line to the ground sheet surface, and the inclinations of the pile yarns are caused by alternating the tensions or feed lengths of the warps.

In the rubbing cloth, the inclination angle of pile is stably controlled. If such rubbing cloth is used for manufacturing a liquid crystal display panel, it is possible to improve the uniformity of alignment in the liquid crystal display panel, and as the result, the picture quality of display device is remarkably improved.

Furthermore, the present inventors found that it is effective to use hydrophobic synthetic fibers one or both of the warps and the wefts of ground texture in the rubbing cloth.

That is, one of the present invention is a rubbing cloth for use in manufacturing liquid crystal display panels which consists of a velvet fabric having a ground sheet texture comprising warps and wefts, and pile yarns woven to the ground sheet texture in the warp direction, wherein one or both of the warps and wefts are hydrophobic synthetic fibers.

This invention can eliminate adverse influences due to cotton waste on alignment layer surface and necessity of long time for removing cotton waste by using hydrophobic synthetic fibers as one or both of the warps and wefts of ground texture. Additionally, This invention can reduce the tendency of elongation of the rubbing cloth in manufacturing liquid crystal display panels because hydrophobic synthetic fibers hardly elongate in a high humidity condition. Furthermore, it can reduce the tendency of dimensional change and texture curving of the rubbing cloth after cutting.

Furthermore, the present inventors found that it is effective to apply a melt treatment to for the edge surface of the cloth.

That is, one of the present invention is a rubbing cloth for use in manufacturing liquid crystal display panels which consists of a velvet fabric having a ground sheet texture comprising warps and wefts, and
pile yarns woven to the ground sheet texture in the warp direction, wherein the edge surface of the cloth was melt treated.

This invention can reduce the falling of pile waste and fraying of the warps or wefts when the rubbing cloth is cut in a desired size because the edge surface of rubbing cloth was melt treated. Consequently, if such rubbing cloth is used, it is possible to reduce the adverse influences to alignment layer surface in manufacturing a liquid crystal display panel.

DETAILED DESCRIPTION OF THE PREFERRED EMBODIMENTS

Figure 1:
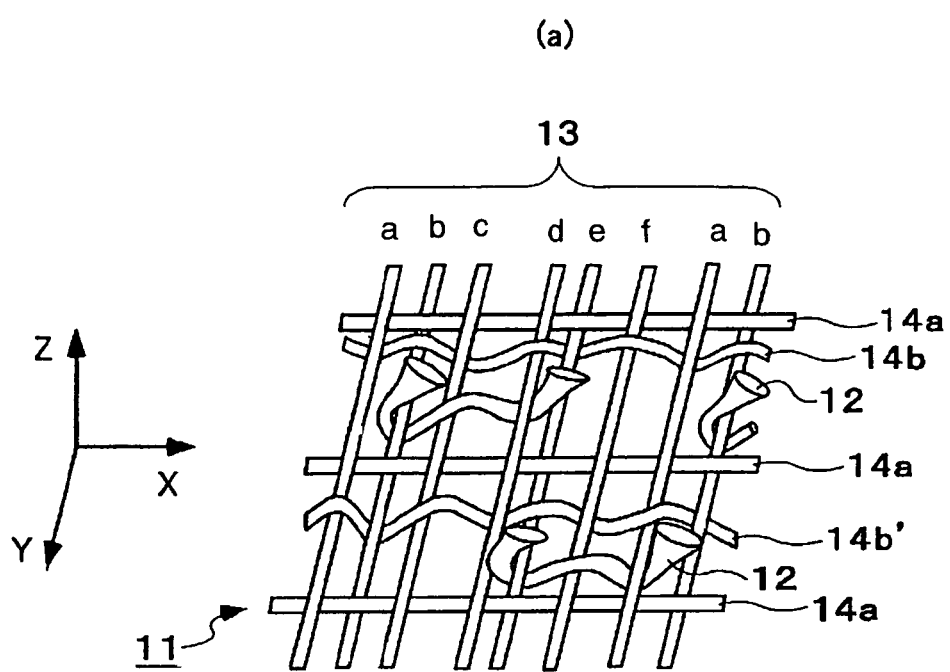
FIG. 1(a) is a schematic view showing a texture of velvet in an embodiment of the invention.
FIG. 1(b) is a cross sectional view thereof.
Figure 1:
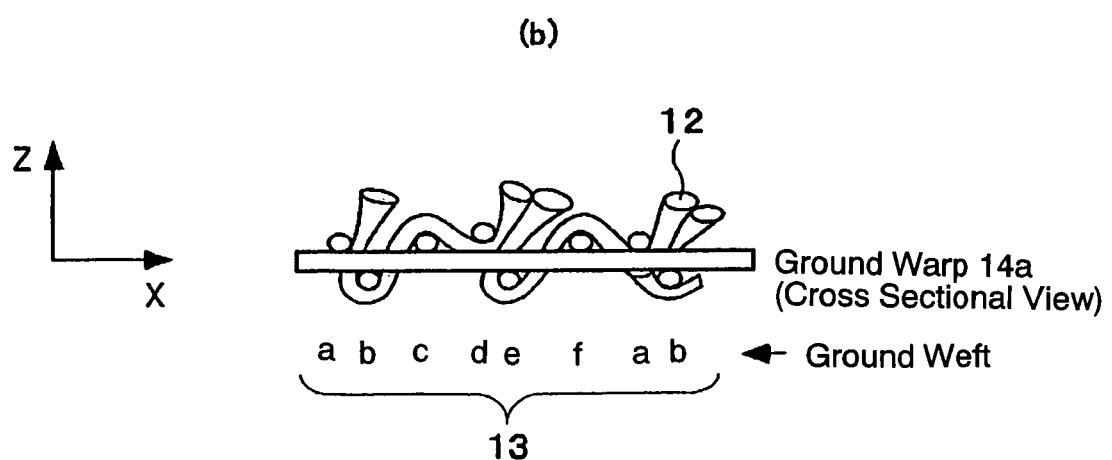
Figure 3:
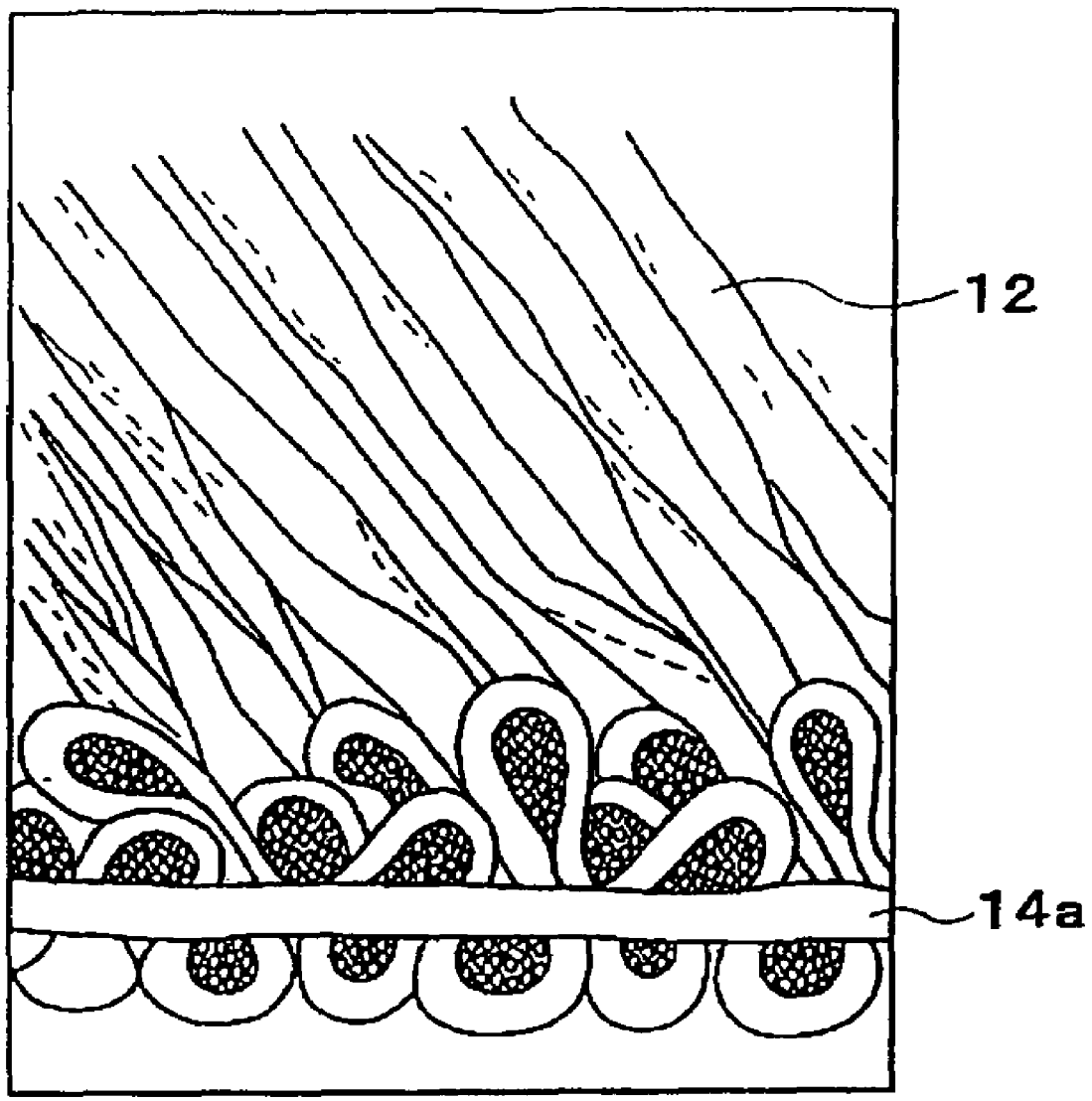
FIG. 3 is a trace over a micrograph of the cross section taken parallel to the warps, of velvet fabric consisting of the texture in FIG. 1.
Figure 4:
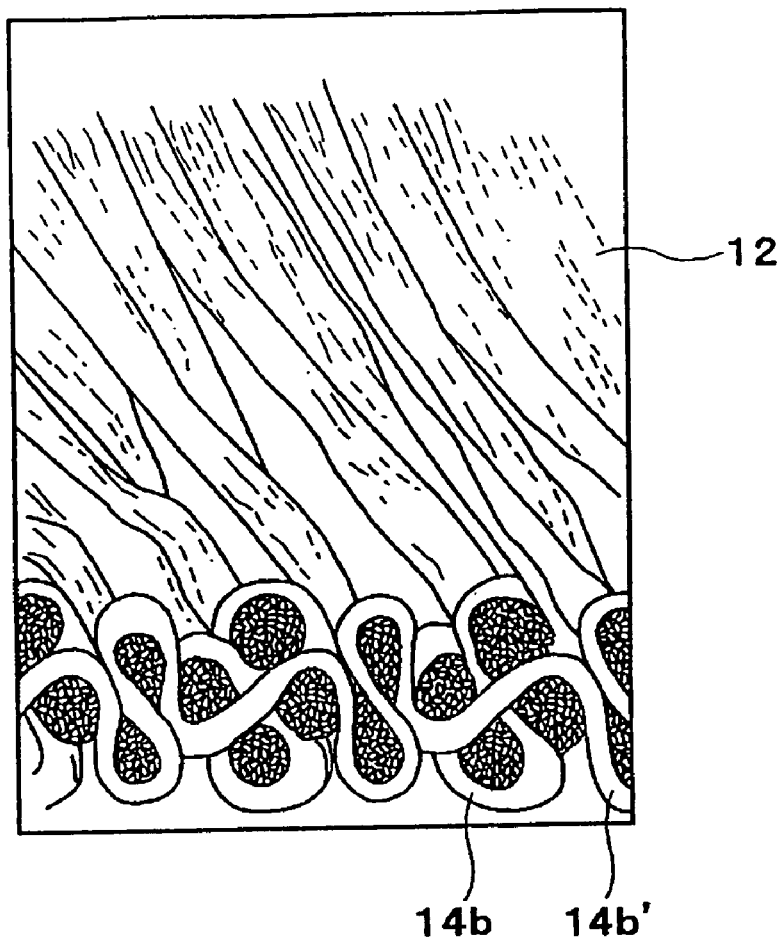
FIG. 4 is a trace over a micrograph of the cross section taken parallel to the warps at a position different from that of FIG. 3, of velvet fabric consisting of the texture in FIG. 1.

FIGS. 1(a) and 1(b) are schematic views showing a texture of velvet in an embodiment of the invention, and FIGS. 3 and 4 are cross sectional views taken parallel to the warps at different positions, of velvet fabric consisting of the texture in FIG. 1.

As shown in FIG. 1(a), the texture of velvet is formed of a ground sheet texture 11 and a pile 12 interwoven to the ground sheet texture 11. The ground sheet texture 11 is woven by using warps 14a, 14b and 14b' fed from a twin beam and the weft 13. In the ground sheet texture of the rubbing cloth, it is important to use a hydrophobic synthetic fiber such as polyester fiber for either one of or both of the warps and the wefts.

At the time of weaving velvet, the warp 14a is fed from one beam of the weaving machine at a high tension. Otherwise, a high tension may be applied at time of beating by reducing the feed amount of the warp 14a. On the other hand, the warps 14b and 14b' are fed from the another beam at a low tension. Otherwise, a low tension may be applied at time of beating by increasing the feed amount of them. The wefts a, c, d and f are positioned on the side where a pile is raised relative to the warp 14a (on the surface side), whereas the wefts b and e are positioned on the back side relative to the warp 14a. The warps 14b and 14b' are interwoven to the weft 13 so that they are positioned on the surface and the back sides relative to the weft 13 alternately.

The present invention is not limited to the texture of velvet shown in FIGS. 1(a) and (b). For example, an embodiment is also possible where the middle warp 14a is omitted from the three warps 14a in FIG. 1(a). Furthermore, by controlling the texture, it is possible to incline the pile 12 in the warp direction.

The inclining of the pile 12 in the velvet fabric (ground sheet texture 11) thus woven will be described with referring to FIGS. 1(a) and 1(b). In this embodiment, by alternating the tensions of warps to be high or low, or by alternating the feed amount of warps to be large or small, at optional predetermined intervals, the wefts interwound with the warps become to be in up and down bumpy form. The details are as follows.

The description shall follow the order of the velvet weaving steps. First, the weft a is fed into an opening formed when the warps 14a, 14b and 14b' are vertically separated from each other as a result of the up-and-down motion of the heddles of the weaving machine and then pushed between the warps as a result of the beating motion of the reed of the machine.

Figure 10:
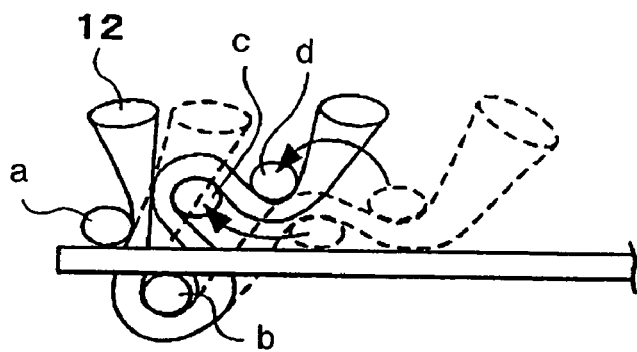
FIG. 10 is a view illustrating the principle upon which the pile is inclined in the texture of FIG. 1.
Figure 10:
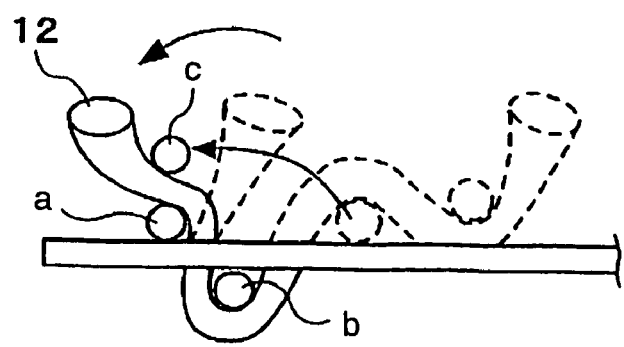

Next, the weft b is fed into an opening formed when the same warps as above are vertically separated from each other keeping a reverse up-and down relation as a result of the up-and-down motion of the heddles in the reverse direction and then pushed between the warps as a result of the beating motion of the reed. A glance at the cross section of FIG. 1(b) shows that the weft b is positioned on the lower right side of the weft a relative to the warp 14a. The weft c, which is to be fed into an opening formed as a result of the subsequent heddles motion, is also pushed into the warp as a result of the beating motion of the reed. In this case, the tension of the warp 14b', which holds the weft c, is low and therefore the weft c tends to be pushed up above the weft b shown in FIG. 10(a). Furthermore, in some cases, the weft c is pushed up above the weft a, leading to the state where the wefts a, b and c are on top of another in a vertical line. Once the wefts are brought to such state, the pile 12 is held inclined by the wefts a to c and provided with an inclination of given degrees in the direction along the warp, as shown in the figures. The wefts d to f are in the same situation.

FIG. 3 is a trace over a micrograph of the cross section (cross section where the warp 14a at a high tension can be seen) of the texture of velvet of this invention. This figure shows a state that the wefts are pushed up onto another and lie on top another, and it can be confirmed that the pile yarns are held inclined by the wefts. The angle of the pile yarns' inclination can be controlled by, for example, the level of difference between the tensions of warps, the level of difference between the feed amount of warps, the density of wefts and the thickness of the wefts. This inclination is physically provided by the texture of cloth. The angle of the inclination is kept fixed as long as the standards of the cloth are not changed and does not return to the original one even if the cloth is heat treated, washed, etc. after weaving.

FIG. 4 shows the cross section (cross section where the warps 14$b$, 14$b'$ in a large feed amount can be seen) of the texture of velvet, taken parallel to the warp at a poison different from that of FIG. 3, where it is observed that warps 14$b$ and 14$b'$ largely undulate.

The pile materials used in the present invention are not limited to natural fibers such as cotton. Every synthetic fibers and semi-synthetic fibers such as triacetate, nylon, vinylon, rayon and polyester can be used.

In the present invention, the pile yarns are inclined in the warp direction relative to the normal line to the ground sheet surface. The inclination angle of the pile yarn to the normal line is preferably 5 degrees or more and 45 degrees or less, more preferably 10 degrees or more and 45 degrees or less.

Figure 2:
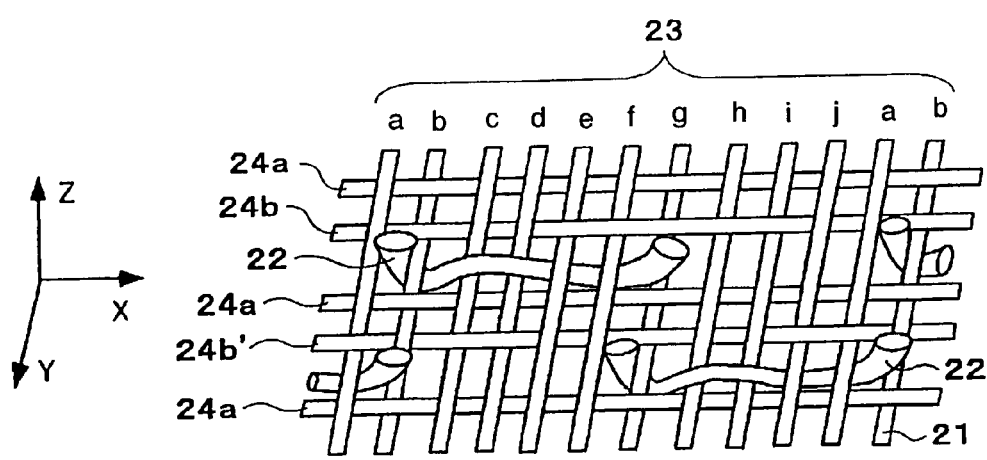
FIG. 2(a) is a schematic view showing a texture of velvet in other embodiment of the invention.
FIG. 2(b) is a cross sectional view thereof.
Figure 2:
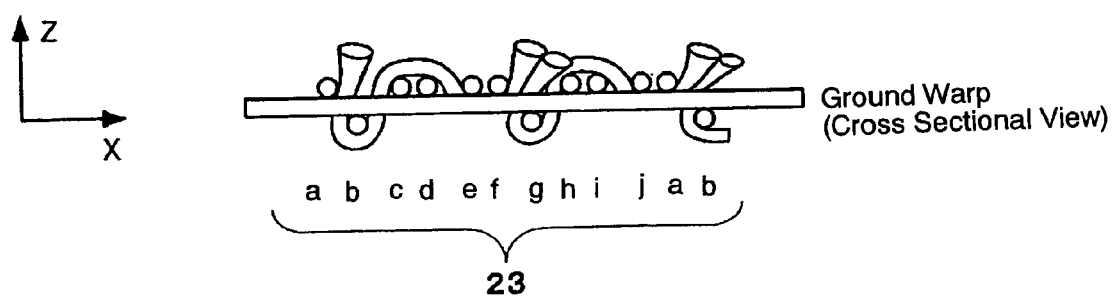
Figure 11:
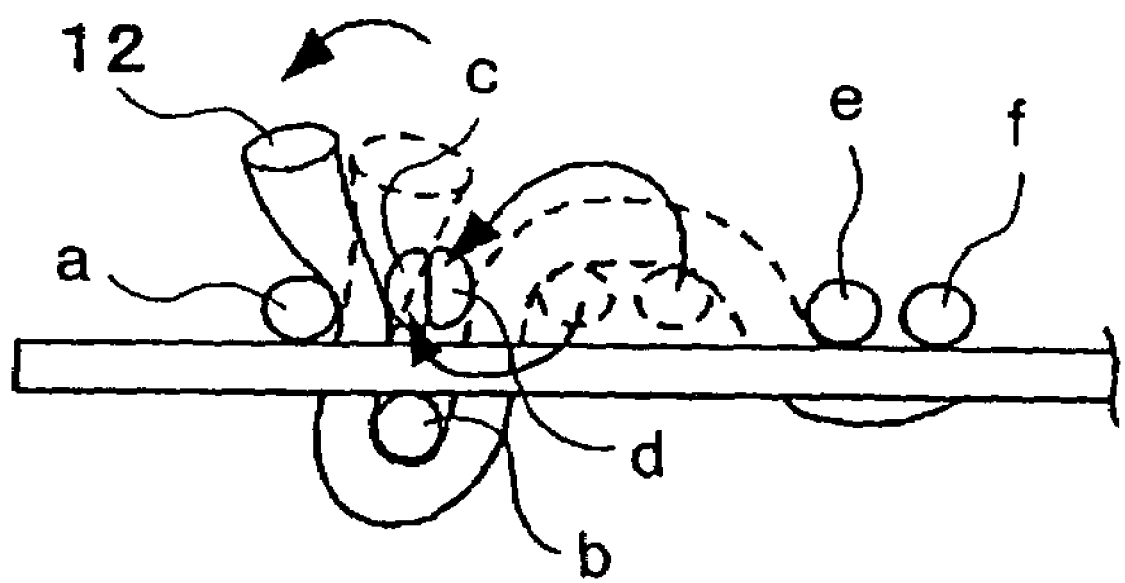
FIG. 11 is a view illustrating the principle upon which the pile is inclined in the texture of FIG. 2.

The texture of velvet is not limited to that of the FIG. 1. For example, the texture shown in FIGS. 2($a$) and ($b$) can also provide the pile with an inclination. In the texture shown in FIGS. 2($a$) and ($b$), the pile yarn is introduced onto every two wefts. In FIGS. 2($a$) and ($b$), though the warps are roughly sketched, weaving is ultimately performed while applying a high or low tension to every other warp, just like the case shown in FIG. 1. Specifically, the weaving is performed while feeding the warps 24$a$ at high tension and feeding the wefts 24$b$, 24$b'$ at a low tension. Otherwise, it can be performed wile feeding them in large or small feeding amount. In the texture, the wefts c and d are smashed into dumpling-like shape above the warps as shown in FIG. 11. In this state, the pile 12 is held by the wefts a to d and provided with an inclination of certain angle in the direction along the warps. In other texture of velvet, the pile can also be provided with an inclination by the same manner.

Methods of alternating the tensions of warps at optional predetermined intervals include, for example, a method in which warps are fed through a twin beam and weaving is performed under the conditions where warps fed through one beam have higher tension than that of warps fed through the other beam. In fact, the weaving velvet by this method makes it possible to raise the pile while maintaining the pile's inclination in the warp direction.

Furthermore, methods of alternating the tensions of warps at optional predetermined intervals include, include a method in which a highly shrinkable synthetic fiber and an ordinary synthetic fiber are alternately placed as the warps at optional predetermined intervals. In this case, the highly shrinkable synthetic fiber is shrunk by an appropriate heat treatment after weaving so that it increases the tension.

For example, in the texture shown in FIGS. 1($a$) and ($b$), a highly shrinkable synthetic fiber is used as the warp 14$a$ while feeding it and the warps 14$b$ and 14$b'$ at almost the same tension through one beam to weave a velvet, and the and then velvet is heat-treated to allow the warp of the highly shrinkable synthetic fiber to shrink. Thus the warp 14$a$ becomes to be at a higher tension than the other warps 14$b$ and 14$b'$. In this method, the fiber which shrinks across its length acts as the warp at a high tension. Thus, the pile can be provided with an inclination caused by the same effect as that of the method using a twin beam.

As the highly shrinkable synthetic fibers, synthetic fibers (e.g., polyester fibers) having shrinkage of 10% or more (130 to 150° C., dry) or boiling water shrinkage (BWS) of 8% or more are preferable. Use of a highly shrinkable synthetic fiber for the ground yarn offers the advantage that it allows the texture to be much closer because the ground yarn is shrunk by heat treatment after weaving. When gaps appear among pile in a rubbing cloth for use in manufacturing liquid crystal display panels, there is a possibility that the gaps cause unevenness of rubbing. Thus, it is better that the texture is much closer. This method makes it possible to form a closer texture beyond the limit of weaving with a weaving machine. This point is one of the noticeable characteristics of the method.

Furthermore, if a highly shrinkable synthetic fiber is used for one or both of the ground warp and the ground weft and the woven fabric is shrunk by heat treatment, the density of the ground yarn of the velvet fabric can be increased and the elongation in the direction at an angle to the texture can be decreased. The shrinkage of the ground yarn affects the inclination of the pile.

The pile yarns preferably consist of synthetic fibers having an electric resistivity of $10^8$ $\Omega$cm or more and $10^{10}$ $\Omega$cm or less. One or both of the warps and wefts which constitute the ground sheet preferably comprise conductive synthetic fibers having an electric resistivity of $10^{-2}$ $\Omega$cm or more and $10^6$ $\Omega$cm or less. Static electricity generated in the step of rubbing alignment layers may cause damage to the TFT elements of liquid crystal display panels. Thus, it is necessary to cause leak of the generated static electricity outside to prevent the accumulation of the static electricity. For example, if Thunderon (registered trade mark, Nihon Sanmo Dyeing Co., Ltd.) which is a copper sulfide fiber having an electric resistivity of $10^{-2}$ $\Omega$cm or more and $10^0$ $\Omega$cm or less, or a conductive fiber with carbon powder mixed thereinto which has an electric resistivity of $10^{-2}$ $\Omega$cm or more and $10^6$ $\Omega$cm or less, or Beltron (registered trade mark, Kanebo Ltd.) which has an electric resistivity of $10^0$ $\Omega$cm or more and $10^6$ $\Omega$cm or less is used, leak of the generated static electricity can be caused by corona discharge to produce effect of reducing the accumulation of the static electricity. Coating the back side of the velvet with a conductive resin with carbon powder mixed thereinto also produces the effect of reducing static electricity. The combination of a conductive fiber and a conductive resin produces a greater effect.

In cutting rubbing cloths, it is extremely important to cut them precisely at a desired angle to the warp (refer to Japanese Patent No.3155177). If the ground sheet texture of rubbing cloth is in a single color, it is difficult to set the cutting angle to the warp accurately. In the present state, the cutting is performed on the assumption that the weft is at right angles to the warp, however, there often occurs texture curving in conventional rubbing cloth, and this is probably one of the factors that cause unevenness in alignment characteristics of liquid crystal display panels between lots.

Accordingly, it is important to use a material hard to deform due to temperature and humidity for the ground sheet texture of rubbing cloth. In order to make it easy to cut rubbing cloths precisely at a significant angle, there is a preferable embodiment wherein among the ground yarns which constitute the ground sheet, some ground yarns are colored yarns having a different color from other ground yarns, and the colored yarns are present at optional predetermined intervals so that the ground sheet texture has different colors at optional predetermined intervals. As the colored yarns, for example, black conductive synthetic fibers containing carbon powder can be used.

As stated above, the present invention may comprises a method wherein among the warps which constitute the ground sheet, some warps are fed in a larger feed amount at optional predetermined intervals than to other warps when the warps are woven.

Means for alternating the feed amounts at optional predetermined intervals may include, for example, a means wherein the warps are fed through a twin beam, and the feed amount of warps through the one beam is larger, and the amount through the another beam is smaller. According to such means, the warps fed in larger feed amount and warps fed in smaller feed amount are arranged at optional predetermined intervals. The control of feeding amounts may be operated by, for example, a control of gear for rotating the warp beam which feeds the warps at beating in weaving, that is active feeding. Furthermore, it can be operated by applying a friction to the warp beam for controlling the rotation of the warp beam which feeds the warps, that is passive feeding.

Furthermore, a highly shrinkable synthetic fiber may be also used as the warp fed in small feed amount, and after weaving, the highly shrinkable synthetic fiber is shrunk to form the ground sheet texture comprises warps with combination of different feed lengths. The highly shrinkable synthetic fiber is not limited, but polyester fiber having a boiling water shrinkage of 8% or more is preferable.

The case that hydrophobic synthetic fibers are used for one or both of the warps and wefts, is explained as follows. In this case, various known synthetic fibers can be used as the hydrophobic synthetic fibers. Concretely, for example, polyester fibers, polypropylene fibers, polyamide fibers (e.g., nylon fibers) and polyethylene fibers can be used. Furthermore, polyvinylchloride fibers, vinylidene fibers, vinylon fibers and aramide fibers can be also used. The pile yarns are not limited. Various yarns can be used which has been known as able to be used for pile yarns. Concretely, for example, viscose rayon, cotton and acetate fiber can be preferably used.

In case that hydrophobic synthetic fibers are used, a velvet fabric can be used as the rubbing cloth. The velvet fabric comprises a ground sheet and pile yarns of raised fibers woven to the ground sheet. The pile yarns may be long fibers or short fibers. As the velvet texture used for the rubbing cloth, a velvet fabric comprising a fast pile shown in FIG. 7 (12=pile, 13=warp 14=weft) is commonly used. Furthermore, a velvet fabric comprising a V-shaped pile (cut pile) shown in FIG. 8 (12=cut pile, 13=warp 14=weft) is also used. In the present invention, hydrophobic synthetic fibers are used for one or both of the warps and wefts of the ground texture in the velvet fabric, and as the result, the effects above stated can be obtained.

The case that the edge surface of the cloth is melt treated, is explained as follows. In this case, it is preferable to use thermoplastic or hot-melt fibers such as polyester fibers for one or both of the warps and wefts.

Figure 12:
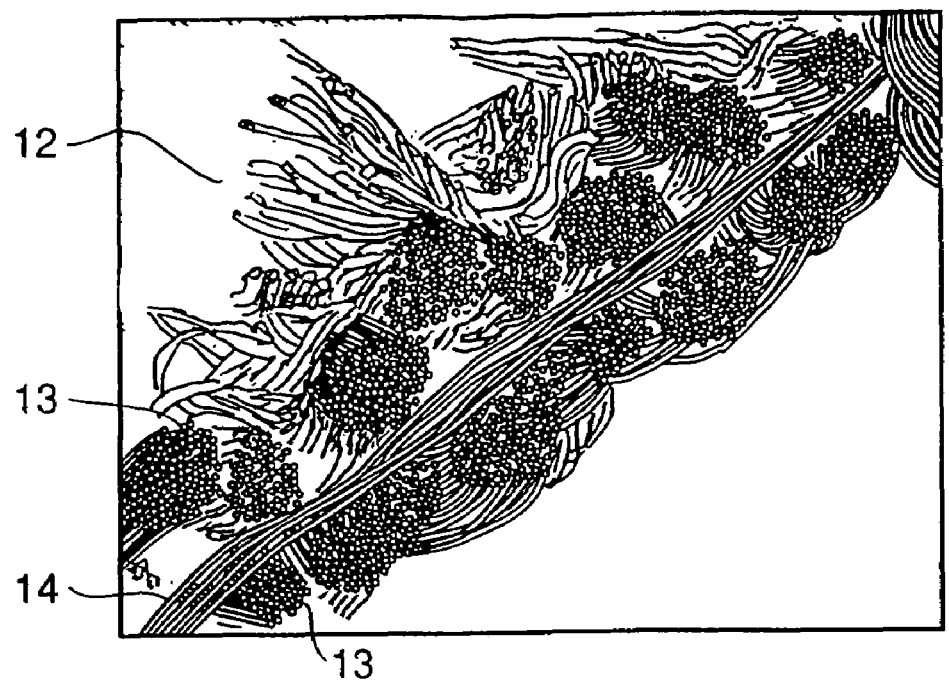
FIG. 12 is a view showing the edge surface of rubbing cloth after cold cutting in Example D1.
Figure 13:
FIG. 13 is a view showing the edge surface of rubbing cloth after melt cutting in Example D1.

FIG. 12 is a trace over an electrical micrograph of the cross section, which was cold press cut, taken almost parallel to the ground yarns of velvet fabric consisting of the texture in FIG. 1. FIG. 13 is a trace over an electrical micrograph of the cross section, which was melt press cut (i.e., melt treated), of the same velvet fabric in FIG. 12. Concretely, FIGS. 12 and 13 are prepared based on electrical micrographs of the cross sections of rubbing cloth 1 after cold cut or melt press cut in Example D1 described latter.

In the cross section shown in FIG. 13, every ground wefts 13 and ground warps 14 in the cross section are melt deformed by pressure of blade used for melt cutting, and the filaments are welded to each other to form hard lumps. Thus, pile yarns 12 are hard to come off. On the other hand, in the cross section shown in FIG. 12 which was formed by cold press cutting, the filaments of ground wefts 13 and ground warps 14 keep their original shapes respectively, and the multi-filaments did not extremely deform.

As the melt treatment for a rubbing cloth, there are at least two preferred embodiments. One of them is an embodiment comprising use of a heated cutting blade. Concretely, a cutting blade is maintained at a high temperature, and a rubbing cloth is press cut by using the cutting blade to melt the edge surface while cutting. Another one of them is an embodiment comprising use of a laser irradiation. Concretely, the laser irradiation can increase the temperature of fibers to cut them while melting. Furthermore, there is a method wherein a rubbing cloth is cold cut and then the melt treatment is conducted by heating the edge surface, i.e., the cut surface, as an after treatment.

The temperature of melt treatment may be optionally set in accordance with the kinds of ground yarns, ground texture and pile yarns. In the embodiment wherein the cutting blade is heated, the temperature of the blade is preferably in a range from 50° C. higher than the melting point of ground yarn to 20° C. lower than the melting point of ground yarn. Furthermore, in view of saving the time for cutting, the temperature is more preferably in a range from 15° C. higher than the melting point of ground yarn to 10° C. lower than the melting point of ground yarn. In the embodiment comprising use of a laser irradiation, it is unnecessary to set a temperature because the edge surface of the cloth is suddenly molten by the laser irradiation.

In case that the edge surface of cloth is melt treated, for example, polyester fibers, polypropylene fibers, polyamide fibers, polyethylene fibers, polyvinylchloride fibers, polyvinylidenechloride fibers, vinylon fibers, fluorine fibers and aramide fibers can be used for the warps and wefts of ground sheet of rubbing cloth. Especially, when thermoplastic or hot-melt fibers are used for ground yarns, the edge surface can be welded by the melt treatment, and as the result, the falling of pile waste and fraying of the warps or wefts become to be few.

As stated above, it is preferable to use thermoplastic or hot-melt fibers for ground yarns. In case that a filament yarn is used, the ground yarn may be a ply yarn or sized yarn.

As the pile yarns, cellulose fibers such as rayon and cotton can be used. Furthermore, thermoplastic fibers such as triacetate fibers polyester fibers can be also used. Concretely, the melt treatment may be conducted while controlling the melt treatment temperature (e.g., temperature of cutting blade edge) with considering the thermal property of the pile yarns.

In the texture of rubbing cloth (raw woven fabric) stated above, the coming off and fraying of pile yarns can be completely prevented, if the warps and wefts of ground cloth are consisting of thermoplastic or hot-melt fibers, and the edge of the rubbing cloth is heat treated at the time or after the cutting process of the rubbing cloth to be a desired size.

The present inventions are further explained in accordance with the examples as follows.

EXAMPLE A1 AND A2, AND COMPARATIVE EXAMPLE A1

Sample Rubbing Cloths and Evaluation of Elongation

Test pieces were prepared by cutting a velvet cloth to 5 cm wide and 30 cm long in such a manner that the cutting angle to the warp is 0, 5, 10, 15, 30 and 45 degrees. Elongation of each test piece at each angle both in the standard state and in the moist state was measured while applying 5 kg of tensile stress to each test piece. The elongation of the ground sheet texture (particularly humidity dependency and anisotropy) is known from this measurement.

Figure 7:
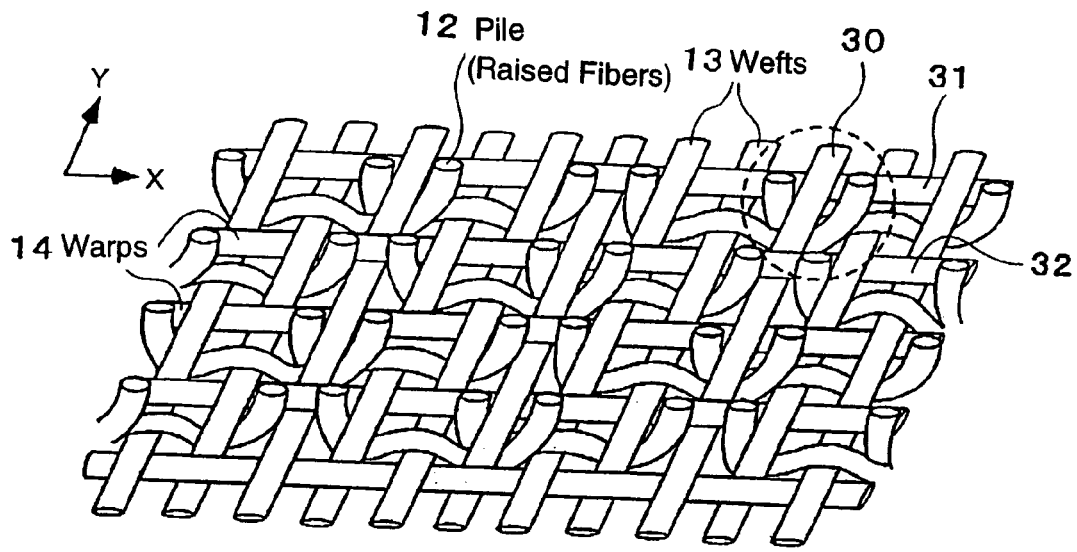
FIG. 7 is a view showing a texture of velvet fabric comprising a fast pile.

In table 1, the textures of Examples A1 and A2 were both the same as that of the velvet of FIG. 7 which uses cupra rayon. The samples of Examples A1 and A2 used triacetate of 84 decitex for the pile and polyester of 110 decitex for the ground warps. The pile was 1.8 mm long. The sample of Example A1 used polyester of 84 decitex for the ground wefts and the sample of Example A2 used highly shrinkable polyester fiber of 84 decitex whose boiling water shrinkage was about 35% for the ground wefts. The back side of each sample was coated with a resin composed mainly of acrylic resin.

The sample of Comparative Example A1 was rayon velvet commercially available from Asahi Chemical Industry Co., Ltd. which used cupra rayon for the ground yarn.

The results show that when applying 5 kg/5 cm of stress to test pieces in the standard state, there was not a large difference in elongation of Examples A1 and A2, which were cut at an angle of up to 10 degrees, from the sample for comparison. However, there was apparently a significant difference of Examples A1 and A2, which were cut at an angle of 15 degrees or more, from Comparative Example A1. For Examples A1, which used polyester fiber for the ground yarn, in the moist state, the elongation was apparently small compared with Comparative Example A1 using cupra. The results also show that in each case, Example A2, which used a highly shrinkable fiber for the wefts, was hard to elongate compared with Example A1. Consequently, in Examples A1 and A2, and Comparative Example A1, superiority in dimensional stability as a rubbing cloth is: Example A2>Example A1>Comparative Example A1.

TABLE 1

| | Elongation (%) | | | | | |
|---|---|---|---|---|---|---|
| | Example A1 | | Example A2 | | Comparative Example A1 | |
| Angle from ground warp | Standard state | Moist state | Standard state | Moist state | Standard state | Moist state |
| 0° | 2.1 | 2.2 | 1.7 | 1.8 | 3.4 | 5.3 |
| 5° | 2.2 | | 1.8 | | 3.6 | |
| 10° | 2.5 | | 2.3 | | 4.0 | |
| 15° | 5.4 | 5.5 | 4.8 | 5.0 | 6.8 | 12.5 |
| 30° | 12.4 | 12.7 | 10.4 | 10.8 | 13.3 | 20.7 |
| 45° | 18.2 | 18.7 | 15.0 | 15.5 | 19.9 | 28.6 |

In Table 1, the term "Angle from ground warp" means the angle between the central line of each cut test piece across its length and the warp, where the angle parallel to the warp is let to be 0°. The term "moist state" means the state of each cut test piece which was left stand at 20° C. and a humidity of 100% for 24 hours and had absorbed moisture. The values of "moist state" were obtained by making measurements right after the test pieces have absorbed moisture. The term "standard state" means the state at 20° C. and a RH of 65%.

EXAMPLES A3 TO A6

Sample Rubbing Cloths and Evaluation of Pile Angle

Table 2 shows the weaving conditions under which velvet was woven whose pile was provided with an inclination in accordance with the texture of velvet of this invention and the inclination angle of the pile (angle to the direction perpendicular to the ground sheet texture) observed from the direction of the test piece length.

Examples A3 to A6 all used polyester 2-ply yarn of 167 decitex or 110 decitex for the ground yarn. Weaving was performed with the tension of a high-tension beam for the ground warps set to 104 to 110 g and the tension of a low-tension beam for the ground warps varied as shown in Table 2, while varying the thickness and density of the wefts. All the samples used cotton 2-ply yarn of No. 60 comber for the pile and the pile was 2.4 mm long.

After weaving, the woven fabric was set at 150° C. and passed through the ordinary finishing steps of, for example, de-sizing scouring, drying and back resin treatment, and a rubbing cloths (velvet fabrics) were obtained.

As shown in Table 2, the results demonstrate that an inclination can be provided to the pile only by the function of the texture. The results confirm that the major factors that determine the inclination angle are the difference in tension between the warps, the thickness of the wefts and the density of the wefts (the density of the wefts has an upper limit depending on its thickness) and that controlling the above factors makes it possible to weave repeatedly and stably fabric whose pile has the same inclination. A part of the test results is shown in Table 2.

TABLE 2

Relationship between weaving conditions and inclination angle of pile

| | Tension of ground warp (g) | | | Density of ground | Inclination |
| | High tension | Low tension | Types of round weft | weft (yarns/cm) | angle of pile (degree) |
|---|---|---|---|---|---|
| Ex. A3 | 104 to 110 | 55 | polyester of 330 decitex | 65.5 | 30.0 |
| Ex. A4 | " | 38 | polyester of 330 decitex | 71.0 | 34.5 |
| Ex. A5 | " | 95 | polyester of 220 decitex | 45.0 | 49.0 |
| Ex. A6 | " | 55 | polyester of 220 decitex | 71.0 | 43.0 |

EXAMPLES A7 TO A9

Sample Rubbing Cloths and Evaluation of Static Electricity

Evaluation was made for the level of static electricity generated in the rubbing cloths of this invention. First, the alignment layers of a liquid crystal display panel were rubbed with each rubbing cloth at a humidity of 60%. Evaluation was made for the static electricity generated on the rubbing roller during the rubbing treatment by measuring the voltage while setting the depth of bite (d in FIG. 5) to 0.5 mm.

The sample of Example A4 shown in Table 3 had the same texture as that of sample of Example A4 shown in Table 2. In this evaluation, it corresponded to that for referential example (untreated sample). On the other hand, the samples of Example A7 to A 9 corresponded to examples of this invention which were subjected to conductive treatment. The sample of Example A7 was woven by warping, in yarn in low tension, at about 10 mm intervals, twisted yarn of a conductive fiber which was obtained by spinning a polyester fiber part of which was mixed with carbon, Beltron (registered trade mark, manufactured by Kanebo Ltd.) of 22 decitex, and polyester of 220 decitex under the same conditions as those of Example A4. Table 3 confirms that static voltage is decreased compared with Example A4.

The Sample of Example A8 was obtained by backing the back side of the sample of Example A4 with a conductive resin obtained by mixing carbon particles (powder) into the resin. Table 3 confirms that static voltage is further decreased compared with Example A4.

The sample of Example A9 was obtained by backing the back side of the sample of Example A7 with a conductive resin obtained by mixing carbon particles (powder) into the resin in the same manner as Example A8. In the sample of Example A9, the effect of decreasing static voltage was most noticeable. This is because static electricity is more rapidly set free toward the above conductive resin and discharged from the entire back side of the rubbing cloth.

In the ground sheet texture in the sample of Example A7, there appeared black lines across its length and thus it was easy to cut the sample to such a size as suitable for being stuck on the roller (in other words, it was easy to determine the cutting direction). The results also confirms that use of a polyester fiber and a highly shrinkable polyester fiber for the ground yarn offers the advantage that it makes it easy to cut the ground sheet weave with a heated cutting blade (~250° C.), allows the cut face to undergo autohesion and makes the post-treatment unnecessary.

TABLE 3

|  | Static voltage (V) |
| --- | --- |
| Ex. A4 | 550 to 680 |
| Ex. A7 | 330 to 380 |
| Ex. A8 | 290 to 320 |
| Ex. A9 | 230 to 250 |

REFERENTIAL EXAMPLE A1 AND EXAMPLE A1

The inclination of the wefts can be reduced by dry-heat treating a raw fabric that is woven using a highly shrinkable (synthetic) fiber for the warps of the ground sheet weave while restricting its shrinkage across its width (in the weft direction). In the following this will be described.

Figure 9:
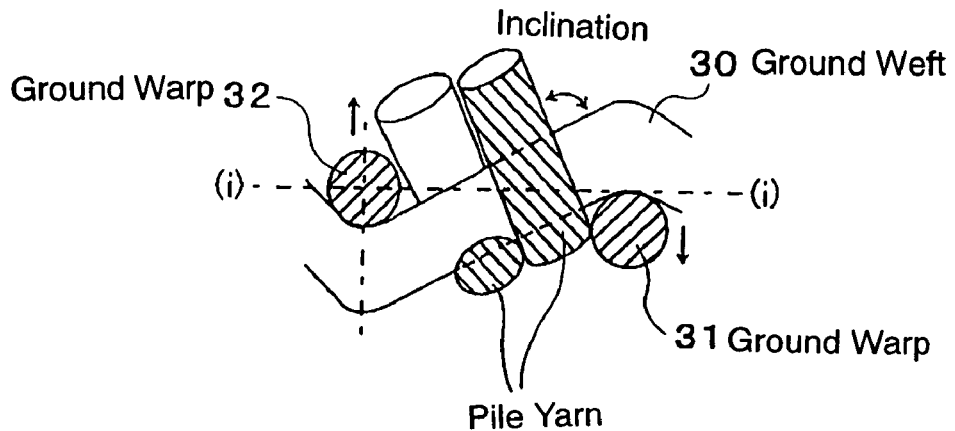
FIG. 9 is a partially enlarged view of the velvet fabric in FIG. 7.

In FIG. 9, when the weft 30 is shrunk (while restricting its length) by dry-heat treatment, a strong shrinkage stress acts on the weft 30 and thereby the undulated weft 30, which passes over and under the warps, tends to straighten. This allows the wefts to overcome the force applied during the weaving and push down the warp 31 while pushing up the warp 32, whereby the inclination of the weft 30 is decreased. The inclination in parallel to the weft of the pile is decreased accordingly.

To confirm this, the velvet with a first pile of (equivalent to) FIG. 7 was woven using the weaves of velvet of Referential Example A1 and Example A10. these Referential Example A1 and Example A10 both used the ordinary polyester fiber of 110 decitex for the warps. For the wefts, Referential Example A1 used the ordinary polyester fiber of 55 decitex and Example A10 used a highly shrinkable (boiling water shrinkage 35%, JISL-1013) polyester fiber of 55 decitex. For the pile, triacetate of 167 decitex was used and the pile was 2.4 mm.

Figure 6:
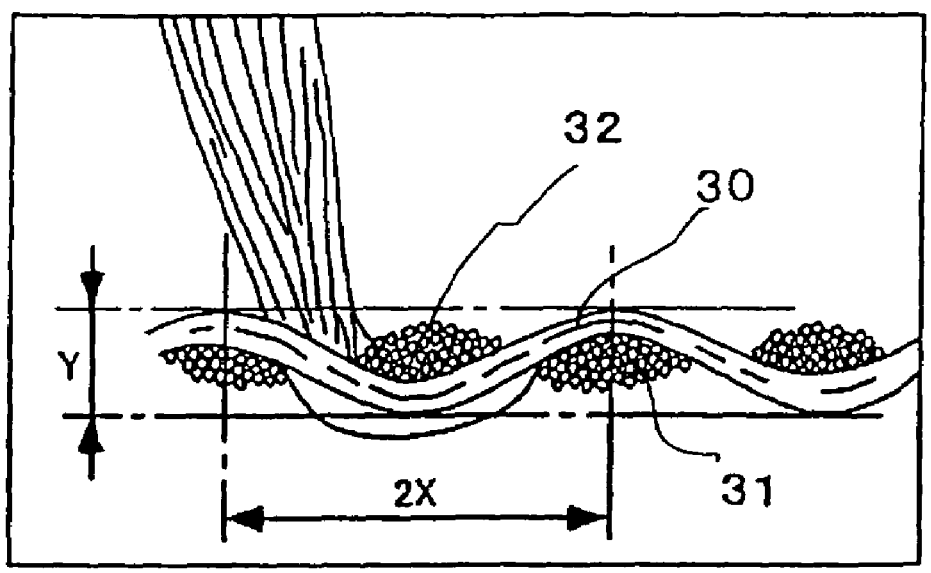
FIGS. 6(a) and (b) are views for confirming the effect of decreasing the inclination of the wefts of velvet fabric in an embodiment of this invention.
Figure 6:
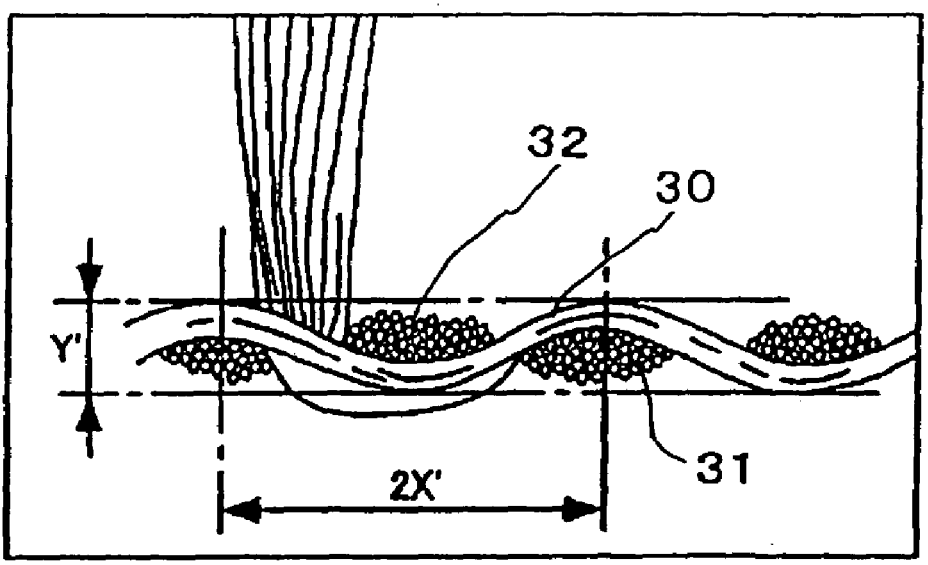

The woven samples of Example A10 and Referential Example A1 were heat treated at 150° C. for 5 minutes. The sample of Example A10, which has the property of shrinking by 12.3% in the free state, was treated while limiting its shrinkage within 5%. The sample of Referential Example A1 hardly undergoes this type of shrinkage. Now, inclination value Z will be defined using the degree of the weft's curving as follows. Specifically, the inclination value Z is defined as the degree of the weft's curving Y per unit length X of the weft that passes over and under the warp, as shown in FIGS. 6(a), 6(b).

TABLE 4

|  | Types of ground weft | Density of ground weft (yarns/cm) | Inclination value Z (Y/X) | Inclination angle of pile in warp direction |
| --- | --- | --- | --- | --- |
| Referential Example A1 | Ordinary polyester polyester of 55 decitex | 56 | 0.53 | 15.0° |
| Example A10 | highly shrinkable polyester polyester of 55 decitex | 54 | 0.46 | 6.7° |

Test results shown in Table 4 suggest that the inclination value of Example A10 was decreased compared with that of Referential Example A1 the comparative example. Accordingly, the inclination of the pile, which tends to be raised perpendicular to the weft, in the weft direction is decreased. FIGS. 6(a), 6(b) are traces over the enlarged micrographs of the cross sections of the ground sheet texture of Referential Example A1 and Example A10 after heat treatment, respectively. FIGS. 6(a), 6(b) show that the curve of the warp was decreased in Example A10 and the inclination of the pile across the warp's width was decreased.

EXAMPLE B1 TO B4

Rubbing cloths in accordance with this invention were produced under the weaving conditions shown in Table 5 and the inclination angle of each material's pile (the angle to the direction perpendicular to the ground sheet weave) was measured, as described below.

In Examples B1 to B4, weaving was performed using polyester 2-ply yarn of 110 decitex for the ground warps while setting the tension of the warp whose feed amount was small to 104 to 110 g and changing, as shown in Table 5, the warp whose feed amount was large and the thickness and density of the ground weft. For the pile yarn was used cotton 2-ply yarn of No. 60 comber. After weaving, the woven fabric was set at 150° C. and passed through the ordinary finishing steps of, for example, de-sizing scouring, drying and back resin treatment before finished. The pile of the finished velvet was made a uniform length of 2.4 mm.

The inclination angle of the pile was measured for each of the rubbing cloths of Examples B1 to B4 produced under the above described conditions. The measured results are shown in Table 5. The results confirmed that different inclination angles could be obtained just by thinking out the texture. The inclination angle was obtained by measuring the inclination angle in the direction along the warp to the normal line to the ground sheet surface. Specifically, the chief factors that determine the inclination angle of the pile are the feed amount of the ground warps and the resultant difference in tension between the ground warps, the thickness of the ground weft, and the density of the ground weft (the density of the ground weft has an upper limit depending on its thickness). This confirmed that controlling the above factors made it possible to weave repeatedly and stably fabric whose pile has the same inclination angle.

Figure 5:
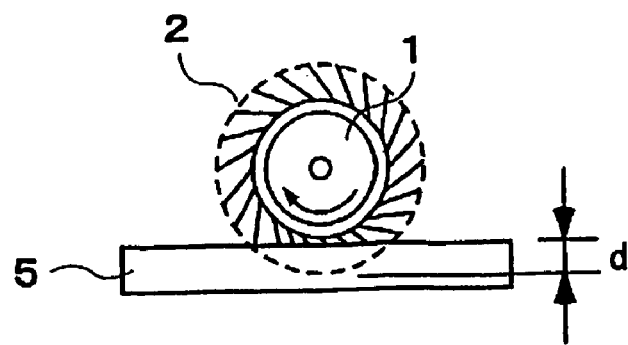
FIG. 5 is a view showing a state in which a rubbing cloth fastened on a roller is in contact with a substrate (rubbing state).

Further, the state of rubbing line development was evaluated by the method shown in FIG. 5. Specifically, the rubbing cloths of Examples B1 to B4 were wound around and stuck to the respective stainless rubbing rollers 1 having a diameter of 50 mm with a double-sided adhesive tape, a solution of polyimide precursor was applied to glass substrates of 10 cm square by the printing method, each of the glass substrate 5 with an alignment layer of polyimide deposited on its surface by heating to 200 to 300° C. was fixed on a moving stage 6, the depth of bite by the rubbing roller was set to 0.5 mm, and rubbing was performed while allowing the moving stage 6 to move in the direction shown by the arrow at a speed of 30 mm/sec. The number of revolution of the rubbing roller was 1500 rpm. As a result, with any one of the rubbing cloths an alignment layer was obtained which was uniform and had decreased number of rubbing lines.

TABLE 5

Relationship between weaving conditions and inclination angle of pile

| | Ground warp whose feed amount is large | | | Density of ground | Inclination |
|---|---|---|---|---|---|
| | Tension | Feed amount*1 | Types of ground weft | weft (yarns/cm) | angle of pile (degree) |
| Example B1 | 74 | 193 | polyester of 220 decitex | 56 | 44.0 |
| Example B2 | 74 | 246 | polyester of 220 decitex | 65.5 | 37.0 |
| Example B3 | 74 | 238 | polyester of 330 decitex | 54.6 | 33.0 |
| Example B4 | 55 | 322 | polyester of 330 decitex | 65.5 | 30.0 |

*1The length of the ground warp whose feed amount was large when the length of the ground warp whose feed amount was small was let to be 100.

EXAMPLE B5 TO B7

Rubbing cloths in accordance with this invention were produced using a triacetate or polyester fiber for the pile yarn and a highly shrinkable yarn for the ground warp whose feed amount was small and the inclination angle of each material's pile was measured, as described below.

In Example B5, weaving was performed using polyester 2-ply yarn of 56 decitex for the ground warps while setting the length of the warp whose feed amount was large to 280, where the length of the warp whose feed amount was small was let to be 100. As for the tension of the warps, it was 104 g to 110 g for the former while 65 g to 70 g for the latter. For the pile yarn was used triacetate 2-ply yarn of 84 decitex. After weaving, the woven fabric was set at 150° C. and passed through the ordinary finishing steps of, for example, de-sizing scouring, drying and back resin treatment before finished. Thus a rubbing cloth (velvet) was obtained.

In Example B6, weaving was performed using highly shrinkable polyester 2-ply yarn of 56 decitex (boiling water shrinkage is 35%, JISL-1013) for the ground warp whose feed amount was small while ordinary polyester 2-ply yarn of 56 decitex, which was less shrinkable, was used for the ground warp whose feed amount was large. The feed amount of the latter was set to 120, where that of the former was let to be 100. As for the tension of the warps at the time of weaving, it was almost the same, 100 g to 110 g, for both yarns. For the pile yarn was used triacetate 2-ply yarn of 84 decitex. After weaving, the woven fabric was heat treated at 150° C. for 5 minutes. When heat treated, the fabric was overfed by 12% in the direction of its length and subjected to tentering by 2%, and then passed through the ordinary finishing steps before finished. Thus a rubbing cloth was obtained. In this Example B6, the ratio of the yarn length was changed by heat treating the highly shrinkable polyester 2-ply yarn to allow the same to shrink so that the pile was provided with a inclination.

In Example B7, a rubbing cloth was produced following the same finishing steps as those of Example B5, except that polyester 2-ply yarn of 84 decitex was used for the pile.

The inclination angle of the pile was measured for each of the rubbing cloths of Examples B5 to B7 produced as described above. The measured results are shown in Table 6. These results confirmed that the pile could be provided with a stable inclination irrespective of whether its material was a natural fiber or a synthetic fiber or a semi-synthetic fiber. The result of Example B6 confirmed that using a highly shrinkable fiber to allow the woven fabric to shrink produced the same effect as that obtained by positively changing the feed amount of the ground warps.

TABLE 6

Inclination angle of pile when changing the type of pile fiber or when using a highly shrinkable yarn

| | Ground warp whose feed amount is large | | | Density of ground | Inclination |
|---|---|---|---|---|---|
| | Tension | feed amount*2 | Types of ground weft | weft (yarns/cm) | angle of pile (degree) |
| Example B5 | 65-70 g | 280 | polyester of 84 decitex | 88 | 39.3 |
| Example B6 | 100-110 g | 120 | polyester of 84 decitex | 52.5 | 17.0 |
| Example B7 | 65-70 g | 280 | polyester of 84 decitex | 88 | 38.0 |

*2The length of the ground warp whose feed amount was large when the length of the ground warp whose feed amount was small was let to be 100.

EXAMPLE C1 TO C3, COMPARATIVE EXAMPLE C1

Rubbing cloths (velvet fabrics) in accordance with this invention were produced using a polyester, nylon or polypropylene fiber for the ground yarn and the elongation of each material was measured, as described below. The velvets were all woven in accordance with the weave shown in FIG. 7.

In Example C1, polyester fiber ply yarn of 56 decitex in which the number of preliminary twist was 900 T.P.M. and that of final twist was 600 T.P.M. was used for the ground warp and polyester fiber yarn of 84 decitex was used for the ground weft. The density of the ground warp was 23 yarns/cm while the density of the ground weft was 44.5 yarns/cm. For the pile yarn was used 2-ply triacetate finished yarn of 84 decitex. Velvet with a pile length of 1.8 mm was woven and finished by ordinary finishing process, and the side of the fabric on which there was no pile was coated with acrylic resin to obtain a rubbing cloth.

In Example C2, nylon fiber ply yarn of 56 decitex in which the number of preliminary twist was 900 T.P.M. and that of final twist was 600 T.P.M. was used for the ground warp and nylon fiber yarn of 56 decitex was used for the ground weft. The density of the ground warp was 23 yarns/cm while the density of the ground weft was 52 yarns/cm. For the pile yarn was used 2-ply triacetate finished yarn of 84 decitex. Velvet with a pile length of 1.8 mm was woven and finished by ordinary finishing process, and the side of the fabric on which there was no pile was coated with acrylic resin to obtain a rubbing cloth.

In Example C3, polypropylene fiber ply yarn of 56 decitex in which the number of preliminary twist was 750 T.P.M. and that of final twist was 450 T.P.M. was used for the ground warp and polypropylene fiber yarn of 56 decitex was used for the ground weft. The density of the ground warp was 23 yarns/cm while the density of the ground weft was 45 yarns/cm. For the pile yarn was used triacetate finished yarn of 84 decitex. Velvet with a pile length of 1.8 mm was woven and finished by ordinary finishing process, and the side of the fabric on which there was no pile was coated with acrylic resin to obtain a rubbing cloth.

In Comparative Example C1, a velvet with a rayon pile was prepared which is being marketed by Asahi Chemical Industry Co., Ltd. for liquid crystal rubbing use and uses cuprammonium rayon yarn for the ground yarn. The velvet is said to use viscose rayon yarn of 84 decitex for the ground warf and viscose rayon yarn of 66 decitex for the ground weft.

In each of the rubbing cloths of Examples C1 to C3 and Comparative Example C1 obtained as described above, the pile was arranged in parallel with the ground warp. It is reported that when an alignment layer is treated by rubbing, preferably a rubbing roller is rotated with an angular deviation of 3 to 45 degrees from the warp of the ground sheet of the rubbing cloth (Japanese Patent No. 3209328).

Test pieces 5 cm wide and 30 cm long were obtained by cuffing the rubbing cloths of Examples C1 to C3 and Comparative Example C1 in the warp direction and at an angle of 15 degrees to the warp direction. Then 5 kg of tensile stress was applied to each of the test pieces in the standard state and in the hygroscopic state to measure its elongation. The measurements show the elongation of the ground sheet weave (particularly the humidity dependency and anisotropy of the weave). The measured results are shown in Table 7.

The results show that in any one of the test pieces obtained by cutting the rubbing cloths of Examples C1 to C3, each employing a hydrophobic synthetic fiber yarn for the ground yarn, in the warp direction and at an angle of 15 degrees from the warp direction, both the elongation in the standard state and in the moist state (A, B) were small. The ratio (B/A) was in the range of 1.02 to 1.09, which indicates that the increase in elongation in the moist state was also small. On the other hand, the results show that the test pieces obtained by cutting the rubbing cloth of Comparative Example C1, which employed cuprammonium rayon yarn for the ground yarn, were easy to elongate in the moist state, and especially the test piece obtained by cutting the rubbing cloth diagonally was easy to elongate by the application of stress.

Furthermore, as in Examples C1 to C3, when long fibers such as polyester fibers, nylon fibers and polypropylene fibers which have a high weaving-ability are used for the ground yarns, a weaving using narrower yarns becomes to be possible, and a weaving using more thicker pile becomes to be possible in case that density of warps is higher or same in the texture.

TABLE 7

| Angle from ground warp | | Elongation under 5 kg/5 cm stress | | |
|---|---|---|---|---|
| | | A: standard state | B: moist state (%) | Ratio (B/A) |
| 0 degree | Example C1 | 2.1 | 2.2 | 1.05 |
| | Example C2 | 2.3 | 2.5 | 1.09 |
| | Example C3 | 2.4 | 2.5 | 1.04 |
| | Comparative Example C1 | 3.4 | 5.3 | 1.56 |
| 15 degrees | Example C1 | 5.4 | 5.5 | 1.02 |
| | Example C2 | 5.8 | 6.3 | 1.09 |
| | Example C3 | 6.2 | 6.3 | 1.02 |
| | Comparative Example C1 | 6.8 | 12.5 | 1.84 |

In Table 7, the term "Angle from ground warp" means the angle between the central line of each cut test piece across its length and the warp, where the angle parallel to the warp is let to be 0. The term "moist state" means the state of each cut test piece which was left stand at 20° C. and a humidity of 100% for 24 hours and had absorbed moisture. The values of "moist state" were obtained by making measurements right after the test pieces have absorbed moisture. The term "standard state" means the state stipulated in Method for Textile Physical Test, JIS L 0105.

EXAMPLE C4

In Example C4, polyester fiber yarn of 56 decitex in which the number of preliminary twist was 900 T.P.M. and that of final twist was 600 T.P.M. was used for the ground warp and polyester fiber yarn of 84 decitex was used for the ground weft. The density of the ground warp was 23 yarns/cm while the density of the ground weft was 45.5 yarns/cm. For the pile yarn was used 2-ply cotton yarn of No. 60 comber. Velvet with a pile length of 1.8 mm was woven and finished by ordinary finishing process, and the side of the fabric on which there was no pile was coated with acrylic resin to obtain a rubbing cloth.

The fabrics of Example C4 and Comparative Example C1 were press cut to 468 mm across the length thereof and 1200 mm across the width thereof using a Thomson cutter blade made of steel material by Nakayama Steel Works, Ltd. As treatment given before the rubbing cloth was stuck on a rubbing roller, an inspection and removal of cotton debris and other impurities on the surface of the rubbing cloth were carried out. As a result, the rubbing cloth of Example C4 had the smallest possible amount of impurities. Thus the operating time was decreased to one sixth of that of Comparative Example C1 and the operation was considerably rationalized

EXAMPLE D1

First, a rubbing cloth having the weave shown in FIG. 1 was produced. For the ground warp was used polyester fiber 2-ply yarn of 56 decitex, for the ground weft polyester fiber 2-ply yarn of 84 decitex, and for the pile yarn 2-ply cotton yarn of No. 60 comber. A velvet with a pile 2.5 mm in height was woven. The density of the ground weft was 75 yarns/cm. The side of the fabric on which there was no pile was coated with acrylic resin to obtain a rubbing cloth 1. Then, a cutter blade 1 mm thick, which was made of S50C steel by Nakayama Steel Works, Ltd. and whose cutting edge was tapered at 35 to 40 degrees, was prepared and the rubbing cloth was melt cut almost parallel to the ground warp with the cutter blade having been provided with heat by energizing a heater. The temperature of the cutting edge at this cutting operation was 265±5° C.

EXAMPLE D2

First, a rubbing cloth having the weave shown in FIG. 7 was produced. For the ground warp was used polyester fiber 2-ply yarn of 56 decitex, for the ground weft polyester fiber 2-ply yarn of 56 decitex, and for the pile yarn triacetate 2-ply yarn of 84 decitex. A velvet was woven and the side of the fabric on which there was no pile was coated with acrylic resin to obtain a rubbing cloth 2. Then, a cutter blade, which was the same type as that of Example D1, was prepared and the rubbing cloth was melt cut almost parallel to the ground warp and at an angle of 15 degrees from the ground warp with the cutter blade having been provided with heat by energizing a heater. The temperature of the cutting edge at this cutting operation was 245±5° C.

EXAMPLE D3

First, a rubbing cloth having the weave shown in FIG. 7 was produced. For the ground warp and ground weft was used nylon fiber (nylon 6) yarn of 56 decitex (17 filaments). Ply yarn in which the number of preliminary twist was 900 T.P.M. and that of final twist was 600 T.P.M. was used for the ground warp. The density of the ground warp was 23 yarns/cm while that of the ground weft was 47.5 yarns/cm. For the pile yarn was used triacetate 2-ply yarn of 84 decitex. A velvet was woven and finished by the ordinary finishing process to obtain a rubbing cloth. Then, a cutter blade, which was the same type as that of Example D1, was prepared and the rubbing cloth 3 was melt cut almost parallel to the ground warp with the cutter blade having been provided with heat by energizing a heater. The temperature of the cutting edge at this cutting operation was 210±5° C.

EXAMPLE D4

First, a rubbing cloth having the weave shown in FIG. 7 was produced. For the ground warp and ground weft was used polypropylene fiber yarn of 56 decitex (24 filaments). Ply yarn in which the number of preliminary twist was 750 T.P.M. and that of final twist was 450 T.P.M. was used for the ground warp. The density of the ground warp was 23 yarns/cm while that of the ground weft was 42 yarns/cm. For the pile yarn was used triacetate 2-ply yarn of 84 decitex. A velvet was woven and finished by the ordinary finishing process to obtain a rubbing cloth. Then, a cutter blade, which was the same type as that of Example D1, was prepared and the rubbing cloth was melt cut almost parallel to the ground warp with the cutter blade having been provided with heat by energizing a heater. The temperature of the cutting edge at this cutting operation was 160±5° C.

COMPARATIVE EXAMPLE D1

Figure 8:
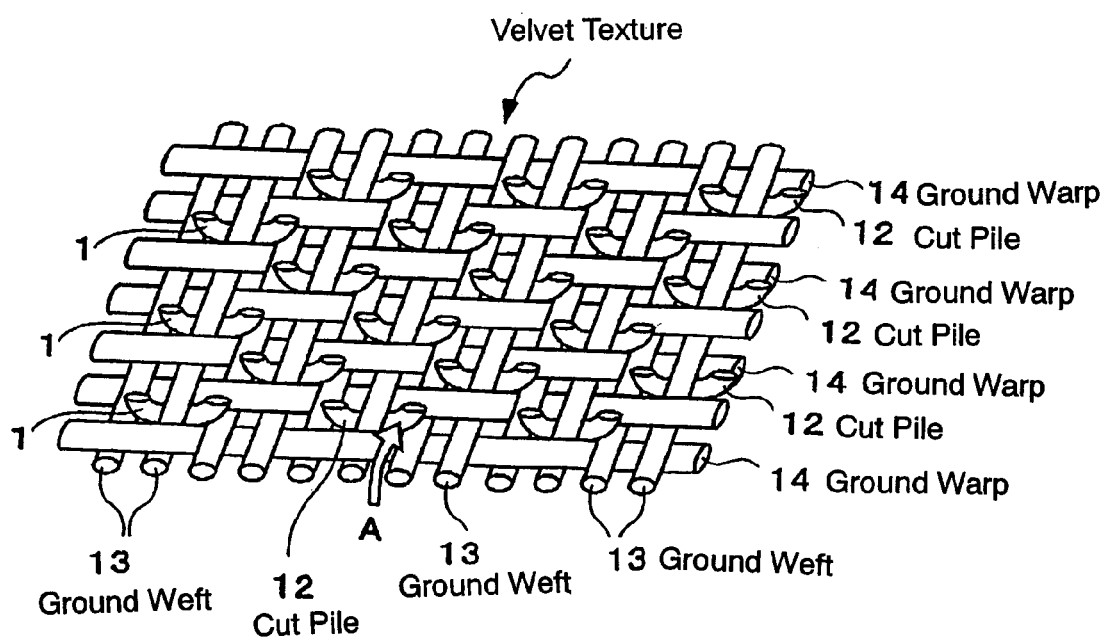
FIG. 8 is a view showing a texture of velvet fabric comprising a V-shaped cotton pile.

First, a commercially available cotton rubbing cloth having the weave shown in FIG. 8 was prepared. The ground warp, ground weft and the pile yarn of this rubbing cloth were all made of cotton 2-ply yarn of No. 40. The pile length was 2.5 mm. The back side of the fabric was said to be coated with vinyl acetate resin. Then a Thomson cutting blade made of steel material by Nakayama Steel Works, Ltd. was prepared and the rubbing cloth was press cut almost parallel to the ground warp and at an angle of 15 degrees from the ground warp with the cutting blade. The temperature of the cutting edge at this cutting operation was ordinary temperature.

<Evaluation>

The edge surface of each of the rubbing cloths cut in Examples D1 to D4 and Comparative Example D1 were rubbed with a velvet and the state of pile's falling out of the surface was observed visually.

In the rubbing cloths of Examples D1 to D4 having been melt cut, including those having been melt cut almost parallel to the ground sheet and those having been melt cut at an angle of 15 degrees from the ground warp, pile's falling was hardly observed because their ground yarns were melt deformed.

On the other hand, in the rubbing cloth of Comparative Example D1 having been press cut at ordinary temperature, though the root of the pile was fixed to the ground sheet by the woven cloth structure and the resin coated on the back side of the fabric, at the sites where the cloth structure of the ground sheet was broken, the root of the pile was insufficiently fixed to the ground sheet and therefore a lot of pile's falling was observed regardless of whether the cloth was cut almost parallel to the ground warp or cut at an angle of 15 degrees from the ground warp. Accordingly, use of the rubbing cloth of Comparative Example D1 may cause pile's falling out of the cloth during the operation of rubbing an alignment layer.

In another example of this invention, a laser cutter can also be used. Laser cutters usable in this invention include, for example, a carbon dioxide laser cutter having output power of 1 KW and cutting speed of 5 m/min, manufactured by Daihen Corporation.

The invention claimed is:

1. A rubbing cloth for use in manufacturing liquid crystal display panels which consists of a velvet fabric comprising:
    a ground sheet texture comprising warps and wefts, wherein the warps are woven to the wefts; and
    pile yarns woven to the ground sheet texture in a weaving direction of the warps,
    wherein the warps are composed of warps having different weaving tensions,
    the wefts are arranged to overlap each other by the different weaving tension of the warps when viewed from the top, and
    the pile yarns are held inclined at an inclination at the same angle in one direction along the warp throughout the rubbing cloth by the wefts.

2. The rubbing cloth for use in manufacturing liquid crystal display panels according to claim 1, wherein the pile yarns are inclined in the warp direction relative to the normal line to the ground sheet surface, and the inclinations of the pile yarns are caused by a difference in tensile distribution of the warps on the ground sheet surface.

3. The rubbing cloth for use in manufacturing liquid crystal display panels according to claim 1, wherein the pile yarns are inclined in the warp direction relative to the normal line to the ground sheet surface, and the inclination angle of the pile yarn to the normal line is 5 degrees or more and 45 degrees or less.

4. The rubbing cloth for use in manufacturing liquid crystal display panels according to claim 1, wherein among the warps which constitute the ground sheet, a lower tension was applied to some warps at optional predetermined intervals than to other warps when the warps were woven.

5. The rubbing cloth for use in manufacturing liquid crystal display panels according to claim 4, wherein the warps which constitute the ground sheet were fed through a twin beam, and a higher tension was applied to warps fed through one beam of the twin beam than to warps fed through another beam of the twin beam when the warps were woven, so that the warps with higher tension and the warps with lower tension are arranged at optional predetermined intervals.

6. The rubbing cloth for use in manufacturing liquid crystal display panels according to claim 1, wherein some of the warps which constitute the ground sheet were highly shrinkable synthetic fibers, and the highly shrinkable synthetic fibers were shrunk after weaving.

7. The rubbing cloth for use in manufacturing liquid crystal display panels according to claim 6, wherein the highly shrinkable synthetic fibers are polyester fibers having a boiling water shrinkage of 8% or more.

8. The rubbing cloth for use in manufacturing liquid crystal display panels according to claim 1, wherein the pile yarns consist of synthetic fibers having an electric resistivity of $10^8$ cm or more and $10^{10}$ cm or less.

9. The rubbing cloth for use in manufacturing liquid crystal display panels according to claim 1, wherein one or both of the warps and wefts which constitute the ground sheet comprise conductive synthetic fibers having an electric resistivity of $10^{-2}$ cm or more and $10^6$ cm or less.

10. The rubbing cloth for use in manufacturing liquid crystal display panels according to claim 9, wherein a resin comprising a conductive substance was coated and cured on the back side of the ground sheet texture.

11. The rubbing cloth for use in manufacturing liquid crystal display panels according to claim 1, wherein among the ground yarns which constitute the ground sheet, some ground yarns are colored yarns having a different color from other ground yarns, and the colored yarns are present at optional predetermined intervals so that the ground sheet texture has different colors at optional predetermined intervals.

12. The rubbing cloth for use in manufacturing liquid crystal display panels according to claim 11, wherein the colored yarns are black conductive synthetic fibers containing carbon powder.

13. A rubbing cloth for use in manufacturing liquid crystal display panels which consists of a velvet fabric comprising:
   a ground sheet texture comprising warps and wefts, wherein the warps are woven to the wefts; and
   pile yarns woven to the ground sheet texture in a weaving direction of the warps,
   wherein the warps are composed of warps having a same apparent length in the ground sheet but having different actual lengths which are lengths if the warps are straight,
   the wefts are arranged to overlap each other by the different weaving tension of the warps when viewed from the top, and
   the pile yarns are held inclined at an inclination at the same angle in one direction along the warp throughout the rubbing cloth by the wefts.

14. The rubbing cloth for use in manufacturing liquid crystal display panels according to claim 13, wherein the pile yarns are inclined in the warp direction relative to the normal line to the ground sheet surface, and the inclinations of the pile yarns are caused by the different feed lengths of the warps of the ground sheet.

15. The rubbing cloth for use in manufacturing liquid crystal display panels according to claim 13, wherein the pile yarns are inclined in the warp direction relative to the normal line to the ground sheet surface, and the inclination angle of the pile yarn to the normal line is 5 degrees or more and 45 degrees or less.

16. The rubbing cloth for use in manufacturing liquid crystal display panels according to claim 13, wherein among the warps which constitute the ground sheet, some warps were fed in larger feed amount at optional predetermined intervals than to other warps when the warps were woven.

17. The rubbing cloth for use in manufacturing liquid crystal display panels according to claim 16, wherein the warps which constitute the ground sheet were fed through a twin beam, and warps fed in larger feed amount and warps fed in smaller feed amount are arranged at optional predetermined intervals.

18. The rubbing cloth for use in manufacturing liquid crystal display panels according to claim 17, wherein the warps fed in smaller feed amount were highly shrinkable synthetic fibers, and the highly shrinkable synthetic fibers were shrunk after weaving.

19. The rubbing cloth for use in manufacturing liquid crystal display panels according to claim 18, wherein the highly shrinkable synthetic fibers are polyester fibers having a boiling water shrinkage of 8% or more.

* * * * *

UNITED STATES PATENT AND TRADEMARK OFFICE
CERTIFICATE OF CORRECTION

| | |
|---|---|
| PATENT NO. | : 7,300,692 B2 |
| APPLICATION NO. | : 10/845765 |
| DATED | : November 27, 2007 |
| INVENTOR(S) | : Yasuo Hirota et al. |

It is certified that error appears in the above-identified patent and that said Letters Patent is hereby corrected as shown below:

Column 1, line 14; After "tape" insert --.--.

Column 1, line 50, Delete "sandwitch" and insert --sandwich--, therefor.

Column 6, lines 39-44, Below "These inventions can provide a stable inclination of pile not by means of resin treatment and heat brushing, but by control of the cloth construction itself. Consequently, the rubbing cloth does not have limitation of the pile material nor problem such as fault due to conventional resin impregnation. In these inventions, the pile yarns are inclined in the wrap direction relative to the normal line to the ground sheet surface, and the inclinations of the pile yarns are caused by alternating the tensions or feed lengths of the warps." delete "In the rubbing cloth, the inclination angle of pile is stably controlled. If such rubbing cloth is used for manufacturing a liquid crystal display panel, it is possible to improve the uniformity of alignment in the liquid crystal display panel, and as the result, the picture quality of display device is remarkably improved." and insert the same at line 38 (Approx.) as a continuous paragraph.

Column 6, line 59, Delete "This" and insert --this--, therefor.

Column 9, line 43, After "intervals" delete "include,".

Column 15, line 35, Delete "A1" and insert --A10--, therefor.

Column 15, line 53, Delete "these" and insert --These--, therefor.

Column 17, line 30, After "*1" insert --:--.

Column 18, line 33, After "*2" insert --:--.

Column 19, line 17, Delete "warf" and insert --warp--, therefor.

UNITED STATES PATENT AND TRADEMARK OFFICE
CERTIFICATE OF CORRECTION

PATENT NO.       : 7,300,692 B2
APPLICATION NO.  : 10/845765
DATED            : November 27, 2007
INVENTOR(S)      : Yasuo Hirota et al.

It is certified that error appears in the above-identified patent and that said Letters Patent is hereby corrected as shown below:

Column 20, line 50, After "rationalized" insert --.--.

Column 22, line 1, Delete "<Evaluation>" and insert --EVALUATION--, therefor. (As a heading.)

Column 23, line 19, In Claim 8, after "$10^8$" insert --$\Omega$--.

Column 23, line 19, In Claim 8, after "$10^{10}$" insert --$\Omega$--.

Column 23, line 24, In Claim 9, after "$10^{-2}$" insert --$\Omega$--.

Column 23, line 24, In Claim 9, after "$10^6$" insert --$\Omega$--.

Column 23, line 33, In Claim 11, delete "yams" and insert --yarns--, therefor.

Signed and Sealed this

Twenty-ninth Day of July, 2008

JON W. DUDAS
*Director of the United States Patent and Trademark Office*